United States Patent
Oyama

(10) Patent No.: US 8,611,609 B2
(45) Date of Patent: Dec. 17, 2013

(54) LANE LINE ESTIMATING APPARATUS

(75) Inventor: Hajime Oyama, Tokyo (JP)

(73) Assignee: Fuji Jikogyo Kabushiki Kaisha, Tokyo (JP)

( * ) Notice: Subject to any disclaimer, the term of this patent is extended or adjusted under 35 U.S.C. 154(b) by 161 days.

(21) Appl. No.: 13/228,130

(22) Filed: Sep. 8, 2011

(65) Prior Publication Data

US 2012/0057757 A1    Mar. 8, 2012

(30) Foreign Application Priority Data

Sep. 8, 2010    (JP) ................................. 2010-201204

(51) Int. Cl.
    G06K 9/00    (2006.01)
    G06K 9/48    (2006.01)

(52) U.S. Cl.
    USPC ............................. 382/104; 382/103; 382/241

(58) Field of Classification Search
    USPC .................................................. 382/103, 104
    See application file for complete search history.

(56) References Cited

U.S. PATENT DOCUMENTS

| | | | |
|---|---|---|---|
| 5,487,116 A * | 1/1996 | Nakano et al. ................. | 382/104 |
| 5,987,174 A * | 11/1999 | Nakamura et al. ............ | 382/199 |
| 6,819,779 B1 * | 11/2004 | Nichani ......................... | 382/104 |
| 6,845,172 B2 | 1/2005 | Furusho | |
| 7,209,832 B2 * | 4/2007 | Yamamoto et al. ........... | 701/301 |
| 7,362,883 B2 * | 4/2008 | Otsuka et al. ................. | 382/104 |
| 7,557,732 B2 * | 7/2009 | Kataoka et al. ............... | 340/933 |
| 2002/0031242 A1 * | 3/2002 | Yasui et al. .................... | 382/104 |
| 2003/0099377 A1 * | 5/2003 | Hanawa ......................... | 382/104 |
| 2011/0320163 A1 * | 12/2011 | Markkula et al. ............. | 702/150 |

FOREIGN PATENT DOCUMENTS

| | | |
|---|---|---|
| JP | 3603836 B2 | 12/2004 |
| JP | 3733875 B2 | 1/2006 |

OTHER PUBLICATIONS

Redmill et al. "A Simple Vision System for Lane Keeping" 1998.*
Wang et al. "Lane Detection Using B-Snake" 1999.*

* cited by examiner

*Primary Examiner* — Utpal Shah
(74) *Attorney, Agent, or Firm* — McGinn IP Law Group, PLLC

(57) ABSTRACT

A fixed data memory stores data of a normal lane width between lane lines and a narrow lane width between inner guide lines of double white lines. A lane-line candidate setting section detects lane-line detection points on both sides of a driving lane using a captured image, and sets lane-line candidate points on the opposite lane lines at spaces of the widths and therebetween, using the detection points as starting points. A curve approximation processing section sets virtual lines on both sides of the driving lane from a curve approximation equation obtained using the detection and candidate points. A lane-line position setting section obtains dispersions of the candidate points to the left and right virtual lines, and estimates the type of at least one of the left and right virtual lines.

15 Claims, 11 Drawing Sheets

LANE LINE ESTIMATING APPARATUS

CROSS-REFERENCE TO RELATED APPLICATIONS

The present application claims priority from Japanese Patent Application No. 2010-201204 filed on Sep. 8, 2010, the entire contents of which are hereby incorporated by reference.

BACKGROUND OF THE INVENTION

1. Field of the Invention

The present invention relates to a lane line estimating apparatus that sets a virtual line on a driving lane corresponding to a lane line based upon an external environment ahead captured by imaging unit mounted on a vehicle.

2. Description of the Related Art

There have conventionally been known driving support apparatuses making various controls during driving on an express highway. There is the one of the driving support apparatuses described above that makes a driving control in which a driving environment ahead of a vehicle is detected, lane lines defining the left side and the right side of a driving lane on which the vehicle runs are detected based upon the detected driving environment data, and the vehicle is allowed to automatically run along the lane lines. There is also one of the driving support apparatuses described above that makes a lane keeping control in which an alarm is issued to alert a driver, when the vehicle is predicted to be deviated from the recognized lane-line positions.

It is necessary to accurately estimate the positions of the lane lines in order to correctly drive the vehicle along the lane lines. As a unit for estimating the position of a lane line, there has been known a technique of detecting an edge of a white line from a brightness difference between a road surface and the white line based upon an image ahead of the vehicle imaged by a camera (hereinafter referred to as an "in-vehicle camera") mounted on the vehicle, so as to determine the position of the lane line from the edge of the white line.

However, on an express highway, there may be not only the right and left lane lines that define a driving lane, but also a double white line including a lane line and a guide line (so-called dot line) formed inside the lane line on a curve. In the technique of detecting an edge of a white line from a brightness difference between the edge of the white line and a road surface, an inner guide line of a double white line is liable to be erroneously recognized as a lane line, since the brightness difference more clearly appears in the case of the white line at the inner side of the road than in the case of the white line at the outer side of the road. In addition, there may be also a case that a track is formed so as to be parallel to a lane line. When a puddle is formed in this track, a high-intensity light is received due to the reflection light from the water surface. Therefore, this track might be erroneously recognized as a lane line.

As a countermeasure, Japanese Patent No. 3733875 describes a technique in which, when a white line detected based upon an image captured by an in-vehicle camera is determined to be a pseudo white line such as a puddle on a track or a double white line, a road parameter excluding a lateral position of the vehicle with respect to the lane line is set so as to prevent the pseudo white line from being erroneously recognized as a white line.

Japanese Patent No. 3603836 describes a technique described below. In the technique, right and left white-line candidate points, which are paired, are detected based upon an image captured by an in-vehicle camera. Among the detected paired right and left white-line candidate points, pairs of candidate points having a same position in the vertical direction are detected. A straight-line approximation equation is obtained from the relationship between the horizontal distance and the vertical position of each of the pairs of the candidate points. True white-line candidate points are extracted from the respective pairs of the candidate points based upon the difference between a horizontal distance calculated from the straight-line approximation equation based upon the position of the candidate point pairs in the vertical direction and a horizontal distance of the candidate point pairs obtained from the image. Then, a road parameter is set based upon the true white-line candidate points, whereby the precision in detecting the true white-line candidate points is enhanced.

The technique described in Japanese Patent No. 3603836 focuses on the point in which lane lines are provided on the left side and on the right side so as to be parallel to each other, and when the right and left lane lines, which are captured by the camera, are subject to a straight-line approximation, the widths of the lanes (lane widths) become zero at disappearance points. Specifically, in this technique, in the case in which the disappearance points agree with each other in the straight-line approximation even when plural straight-line candidates are present on the right and left sides, the straight-line candidates can be determined to be a double white line.

In the technique described in Japanese Patent No. 3733875, when the pseudo white line is detected, the road parameter excluding the lateral position is set. Therefore, when a driver intends to drive the vehicle on an optional position, such as the center of the driving lane, the driver cannot set the driving line of the vehicle at the center of the driving lane, because there is no data involved with the lateral position. Accordingly, the driving control becomes unstable.

A tire of a running vehicle frequently passes on the inner guide line (dot line) of the double white line painted on the road surface of an express highway, so that the inner guide line are frequently faded in most cases. Therefore, the brightness difference between the edge of the inner guide line and the road surface is small, resulting in that it might be difficult to detect the inner guide line. In this case, the candidate points of the true white line at the outside and the candidate points of the inner guide line cannot clearly be identified in the vicinity of the disappearance point. Therefore, in the technique described in Japanese Patent No. 3603836, the detection precision of the true white line becomes poor.

SUMMARY OF THE INVENTION

The present invention has been made in view of the above circumstances and aims to provide a lane line estimating apparatus that can highly precisely estimate positions of lane lines on the left side and on the right side that define a driving lane, even when a lane line on a road is a double white line, or even under a situation in which a track is formed and this track is liable to be erroneously recognized as a white line due to a reflection light from a puddle in the track.

In order to attain the foregoing object, a lane line estimating apparatus according to the present invention includes: imaging unit mounted on a vehicle and configured to image an external environment of the vehicle; storage unit configured to store data of a lane-line width for each of plural predetermined lane-line types; lane-line candidate point setting unit configured to detect left-hand and right-hand lane-line detection points on a driving lane, on which the vehicle runs, based upon an image of the external environment imaged by the imaging unit, and to set lane-line candidate points on the opposite lane line with a space of the lane-line width, using the left-hand and right-hand lane-line detection points as starting points; curve approximation processing unit configured to obtain a curve approximation equation based upon lane-line detection points opposite to the lane-line detection points detected by the detecting unit and the lane-line candidate points set by the lane-line candidate point setting unit, in order to set virtual lines on the left side and on the right side of the driving lane from the curve approximation equation; and a lane-line type estimating unit configured to obtain the dispersion of the virtual lines set by the curve approximation processing unit so as to estimate the lane-line type of at least one of the left-hand and right-hand virtual lines from the pair of left-hand and right-hand virtual lines indicating the smallest dispersion.

According to the present invention, the lane-line detection points are detected on the left side and on the right side of the driving lane, the lane-line candidate points are set on the positions of the lane-line width for each of the predetermined lane-line types on the opposite lane line, using the lane-line detection points as starting points. The virtual lines are set on the left side and on the right side of the driving lane from the curve approximation equation that is set based upon the lane-line detection points and the lane-line candidate points, and the dispersion of the lane-line candidate points for each of the lane-line width with respect to the virtual lines is obtained, so as to estimate the lane-line types of the left-hand and right-hand corresponding to the lane-line width indicating the smallest dispersion as a lane-line type of virtual lines. Therefore, a lane line can be highly precisely estimated, even when a lane line on a road is a double white line, or even under a situation in which a track is formed and this track is liable to be erroneously recognized as a white line due to a reflection light from a puddle in the track.

BRIEF DESCRIPTION OF THE DRAWINGS

FIG. 13A is an explanatory view illustrating a state in which left-hand candidate points are plotted, using right-hand detection points as starting points. FIG. 13B is an explanatory view illustrating a state in which right-hand candidate points are plotted, using left-hand detection points as starting points. FIG. 13C is an explanatory view illustrating a situation in which the left-hand detection points are determined to be an edge of the track.

DETAILED DESCRIPTION OF THE PREFERRED EMBODIMENTS

Figure 1:
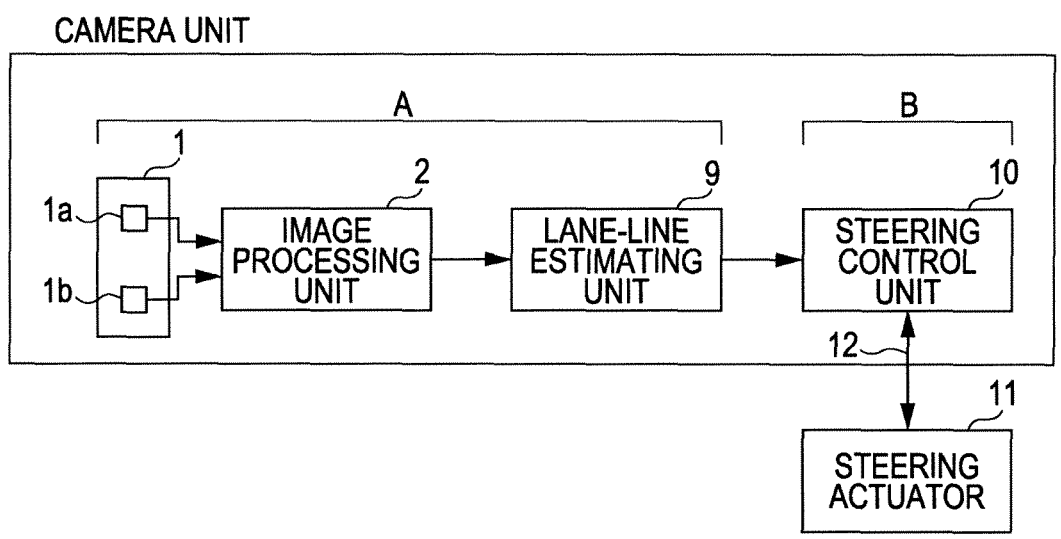
FIG. 1 is a functional block diagram illustrating a configuration of a driving control apparatus.

Hereinafter, an embodiment of the present invention will be described with reference to the drawings. A driving control apparatus illustrated in FIG. 1 includes an image processing system A and a steering control system B, wherein the image processing system A includes an imaging unit 1, an image processing unit 2, and a lane-line estimating unit 9, while the steering control system B includes a steering control unit 10 and a steering actuator 11. In the present embodiment, the image processing system A and the steering control unit 10 are mounted on a camera unit. Examples of the steering actuator 11 include an electric motor and a hydraulic motor.

The steering control unit 10 is mainly composed of a microcomputer. The steering control unit 10 is connected to the steering actuator 11 via an in-vehicle communication line 12 such as CAN (Controller Area Network) so as to be capable of making a two-way communication. The steering control unit 10 sets a steering angle such that the vehicle drives along right-hand and left-hand lane lines painted on a driving lane based upon lane-line data transmitted from the image processing system A, and outputs a corresponding steering torque to the steering actuator 11. The steering actuator 11 performs steering with the steering torque based upon the steering angle from the steering control unit 10 so as to adjust an advancing direction of the vehicle.

Figure 2:
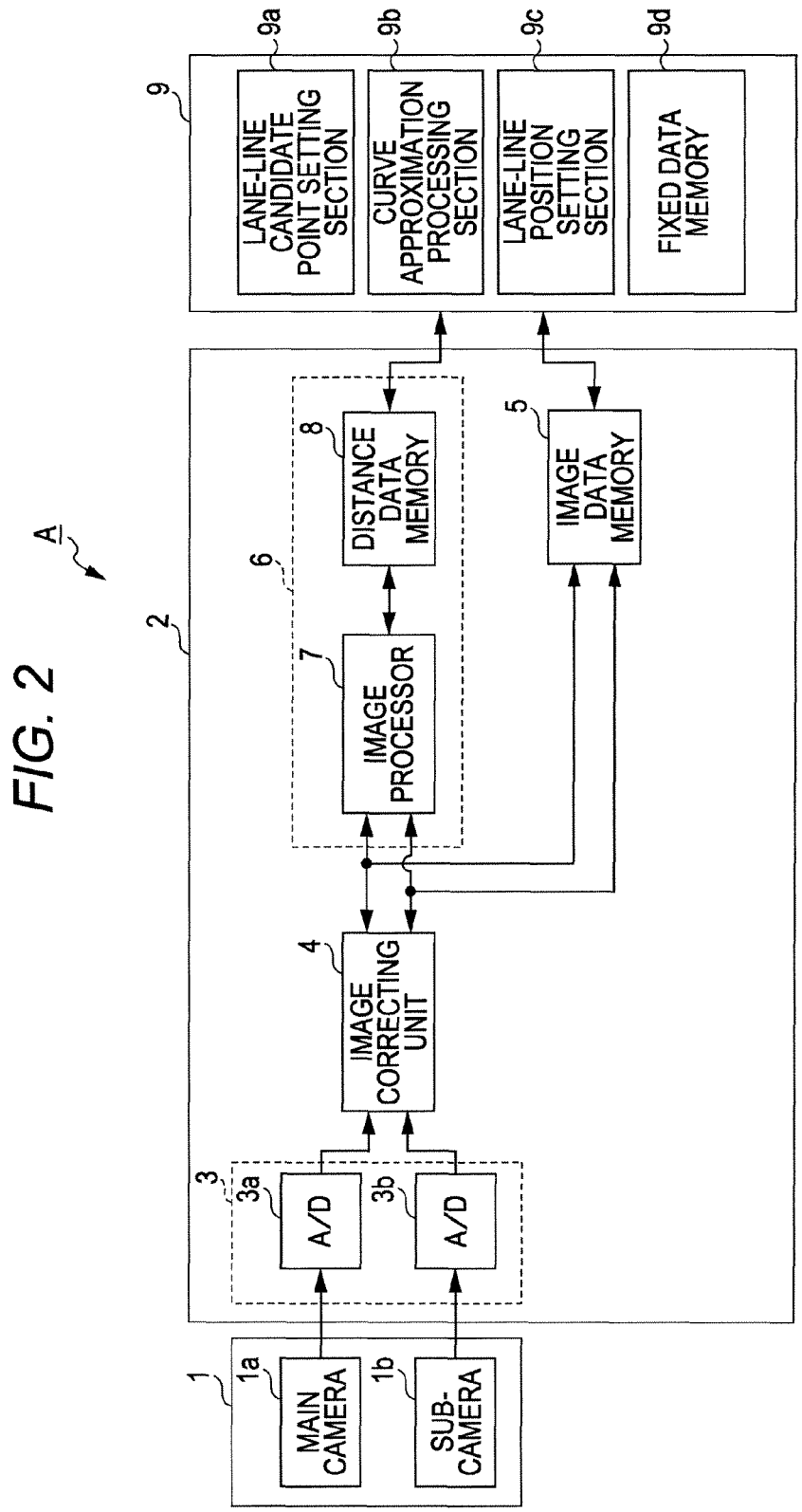
FIG. 2 is a functional block diagram illustrating a lane line estimating apparatus.

As illustrated in FIG. 2, the imaging unit 1 in the image processing system A includes a stereo camera having a main camera 1a and a sub-camera 1b. Both cameras 1a and 1b are mounted, for example, horizontally with a predetermined space therebetween above a rearview mirror and at the center of the position close to a windshield in the width direction of the vehicle. An imaging device such as a CCD or CMOS is provided to both cameras 1a and 1b, wherein the image devices capture an external environment in front of the vehicle including a driving lane on which the vehicle runs.

A pair of analog images captured by both cameras 1a and 1b are output to the image processing unit 2. The image processing unit 2 includes an A/D converting unit 3, an image correcting unit 4, an image data memory 5, and the lane-line estimating unit 9. Each of the analog images captured by the respective cameras 1a and 1b is converted into a digital image, having a predetermined brightness and gradation, by a corresponding A/D converter 3a or 3b provided to the A/D converting unit 3, and then, output to the image correcting unit 4.

The image correcting unit 4 performs an image correction such as a correction of a brightness value including the elimination of a deviation or noise caused by an error in the mounting position of the cameras 1a and 1b. Accordingly, reference image data are generated from an output signal from the main camera 1a, while comparison image are generated from an output signal from the sub-camera 1b, the data having a length in the vertical direction same as that of the reference image and a length in the horizontal direction larger than that of the reference image. The reference image data and the comparison image data are stored in the image data memory 5, and output to image processing unit 6.

The image processing unit 6 includes an image processor 7 and a distance data memory 8. The image processor 7 calculates distance data of a same subject (a distance from the vehicle to a subject) in both images based upon the parallax between the reference image data and the comparison image data by utilizing the principle of triangulation, and then, stores the resultant to the distance data memory 8.

Figure 10:
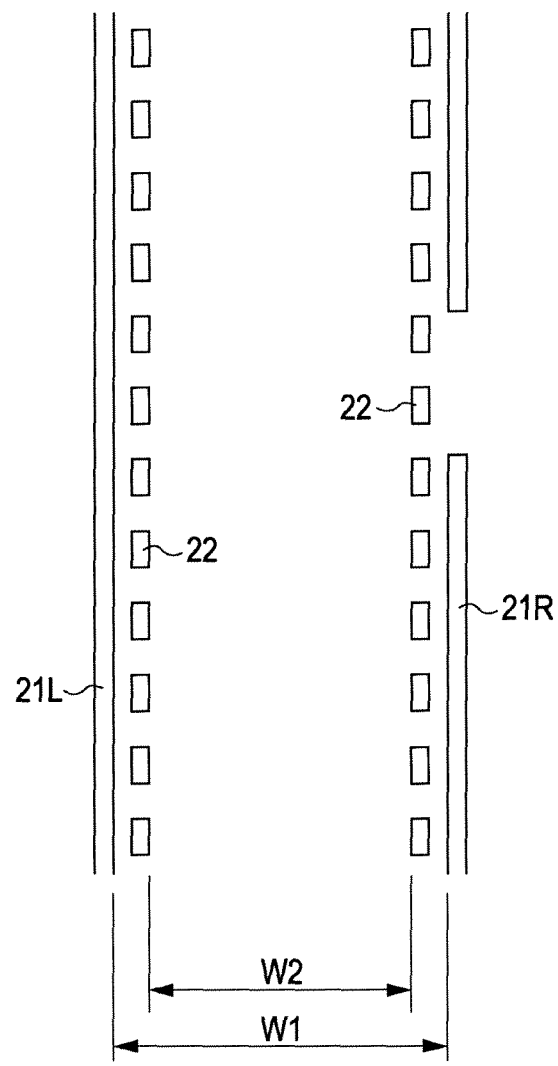
FIG. 10 is an explanatory view illustrating lane widths between lane lines and between guide lines.

The lane-line estimating unit 9 includes a lane-line candidate point setting section 9a serving as lane-line candidate point setting unit, a curve approximation processing section 9b serving as curve approximation processing unit, a lane-line position setting section 9c serving as lane-line position setting unit, and a fixed data memory 9d serving as storage unit. As illustrated in FIG. 10, the fixed data memory 9d stores data of a lane-line width (hereinafter referred to as a "normal lane width") W1 between left and right lane lines 21L and 21R that define the driving lane, and a lane-width (hereinafter referred to as a "narrow lane width") W2 between inner guide lines 22 of double white lines, and lane-line type determining data pieces T1 and T2 indicated in later-described Tables 1 and 2.

On the driving lane on an express highway, one lane line 21L is painted on the left side and one lane line 21R is painted on the right side. On a road such as a curve on which a vehicle is liable to be deviated from the driving lane, double white lines are painted, each having a dashed guide line (dot line) 22 at the inside of the lane lines 21L or 21R. The width between the lane lines 21L and 21R and the width between the inner guide lines 22 are determined to fall within a predetermined range beforehand. For example, the width between the lane lines 21L and 21R is approximately 3.25-3.5 [m], and the width between the inner guide lines 22 is approximately 2.8-3.05 [m]. Therefore, if the distance between the lane lines can be identified, the type of the lane line can be estimated from this distance.

The lane-line candidate point setting section 9a reads the reference image data and the comparison image data, which are captured during a current detection and stored in the image data memory 5, and reads the distance data stored in the distance data memory 8. Then the lane-line candidate point setting section 9a detects detection points (hereinafter referred to as a "lane-line detection point") P, in the reference image data, on the lane lines on both sides of the driving lane on which the vehicle runs, based upon the data pieces, and sets normal candidate points G1 and narrow candidate points G2 on the side of the opposing lane detection points P based upon the lane detection points P, and the normal lane width W1 and the narrow lane width W2 stored in the fixed data memory 9d.

Figure 6:
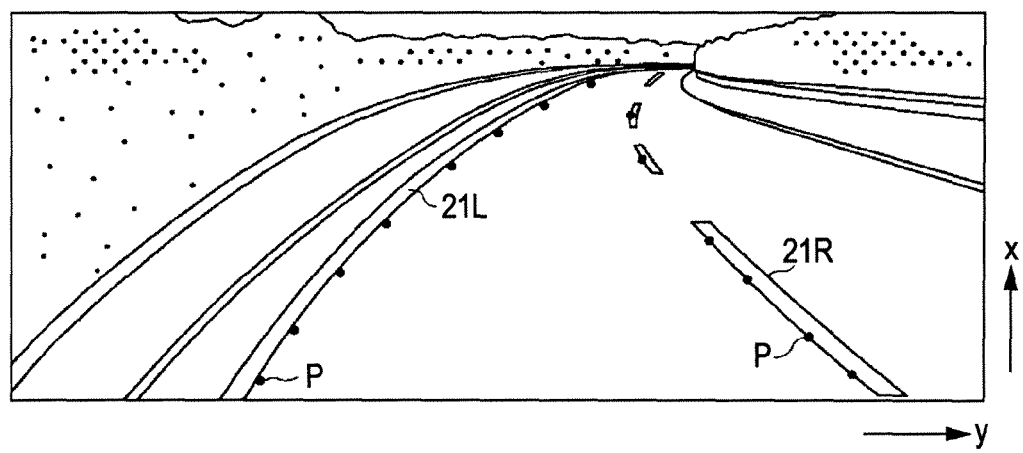
FIG. 6 is an explanatory view of a state in which lane-line detection points on lane lines are detected from an image captured by imaging unit.
Figure 7:
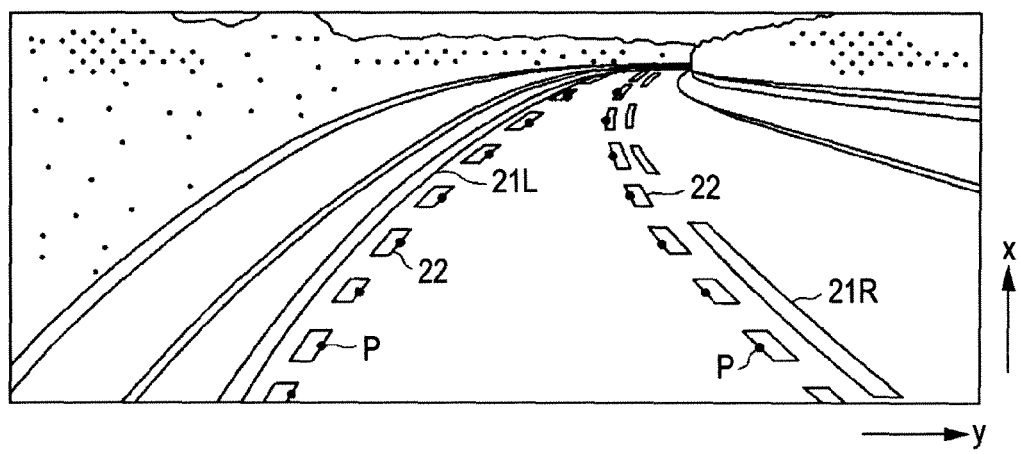
FIG. 7 is an explanatory view of a state in which lane-line detection points on inner guide lines of double white lines are detected from an image captured by imaging unit.
Figure 8:
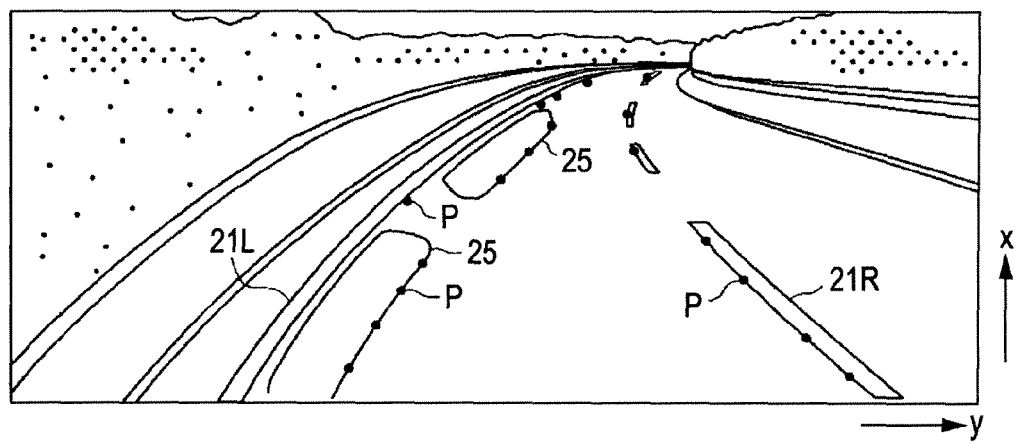
FIG. 8 is an explanatory view of a state in which lane-line detection points on tracks are detected from an image captured by imaging unit.

Specifically, the lane-line candidate point setting section 9a sequentially searches a pixel, while offsetting one pixel-width by one pixel-width from the bottom (from the near side of the vehicle) toward the top (toward the far side) on a horizontal line of one pixel width on the reference image data of one frame captured at the current detection, thereby detecting a pixel satisfying a condition in which a brightness derivative value of the pixel, i.e., an edge intensity (brightness difference), is greatly changed to be not less than a threshold value, based upon the brightness value of each pixel in the reference image data. The edge intensity more strongly appears on the inner edge than on the outer edge. Therefore, when one lane line 21L is painted on the left side and one lane line 21R is painted on the right side of the driving lane as illustrated in FIG. 6, the inner edges of the lane lines 21L and 21R are detected as the lane-line detection points P. In the case of a double white line as illustrated in FIG. 7, the inner edges of the inner guide lines 22 are detected as the lane-line detection point P. As illustrated in FIG. 8, when tracks 25 are formed along one of lane lines (in the present embodiment, the left-hand lane line 21L) of the driving lane, and a puddle is formed on any of the tracks 25, wherein a reflection light from the puddle such as sunlight or illumination light is received by both cameras 1a and 1b with a high intensity, the intensity of the edge between the tracks 25 and the road surface increases. Accordingly, the lane-line detection point P is detected on the edge portion between the inside of the tracks 25 and the road surface. As for the left-hand and right-hand lane-line detection points P, the distance of one pixel increases, as the screen moves from the bottom (from the near side of the vehicle) toward the top of the screen (to the far side), so that the detection precision of the left-hand and right-hand lane-line detection points P at the far side is relatively lower than that of the left-hand and right-hand lane-line detection points P at the near side.

Figure 9:
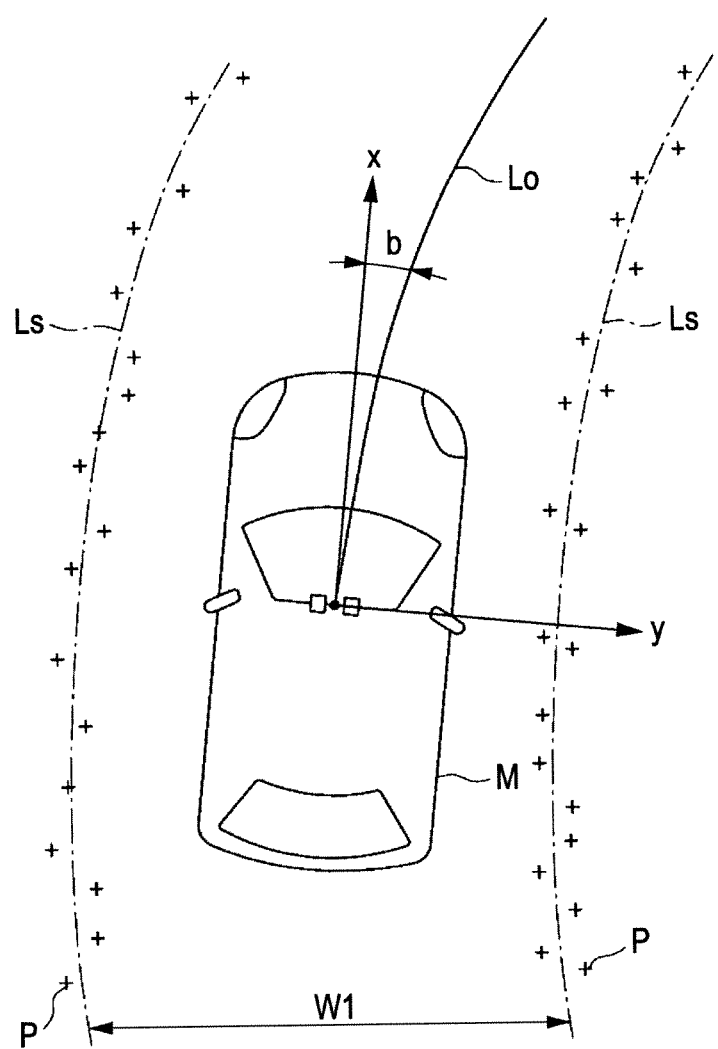
FIG. 9 is an explanatory view illustrating a state in which a positional relationship between a vehicle and lane lines during driving on a curve is displayed on a virtual plane.

Then, as illustrated in FIG. 9, the left-hand and right-hand lane-line detection points P, calculated based upon the distance data, are re-plotted on a plane of a virtual road generated based upon the reference image data and the comparison image data. A vehicle M is displayed on the plane of the virtual road. A coordinate described below is set. Specifically, in the coordinate, a point on the road surface immediately below the portion between the cameras 1a and 1b, provided to the imaging unit 1, at the center in the width direction of the vehicle is defined as an origin, the width direction of the vehicle M is defined as a y axis, and the longitudinal direction of the vehicle M is defined as an x axis. Reference symbol denotes an angle (yaw angle) between the lane line and the vehicle M, which will be described later. On the drawing, left-hand and right-hand lane-line detection points P are sparsely plotted. However, they are actually plotted more densely.

Figure 11:
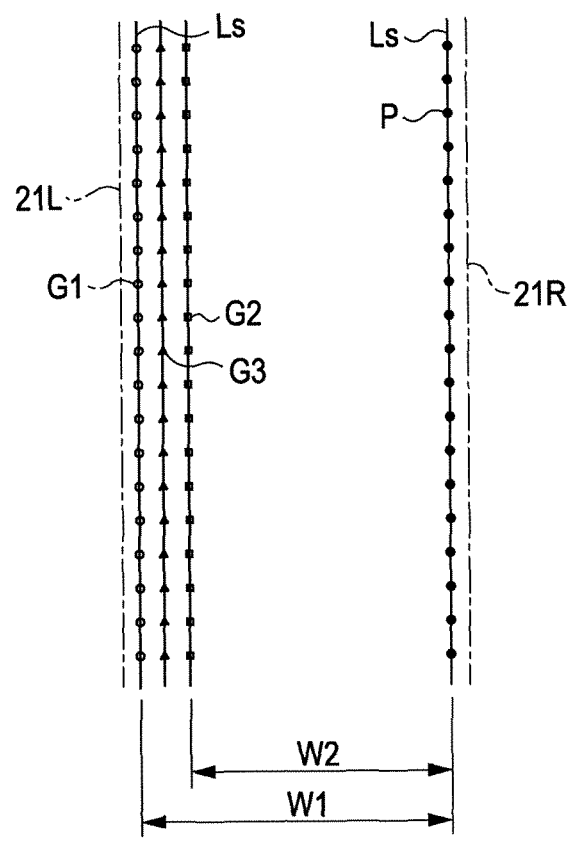
FIG. 11 is an explanatory view illustrating a state in which candidate points on a left-hand white line are plotted, using detection points on a right-hand lane line as starting points.
Figure 12:
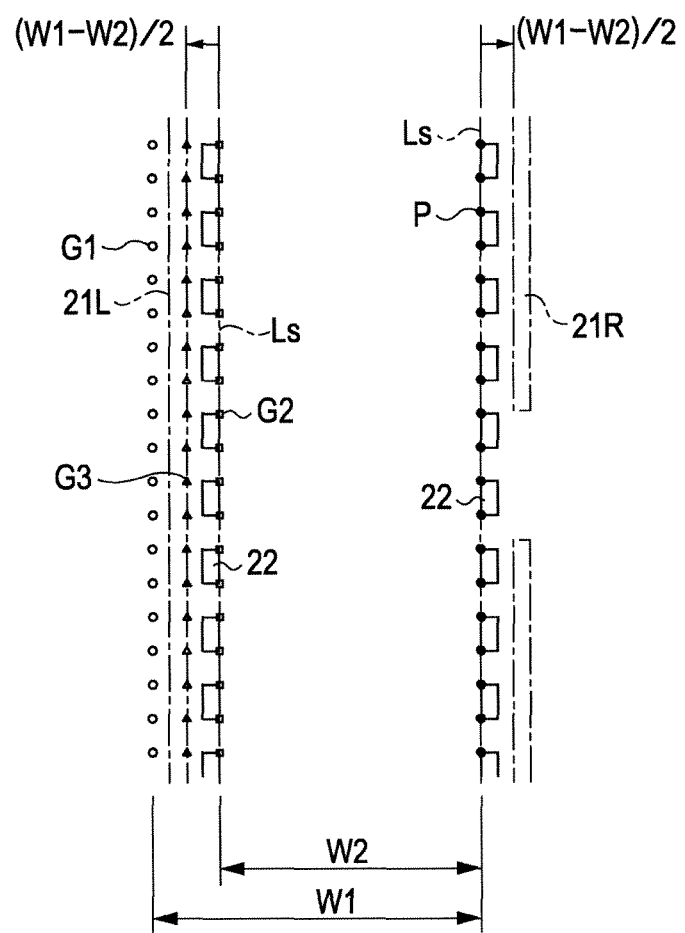
FIG. 12 is an explanatory view illustrating a state in which candidate points on a left-hand white line are plotted, using detection points on a right-hand guide line of a double white line as starting points.

As illustrated in FIGS. 11 to 13, the candidate points G1, G2 and G3, which are set using the lane-line detection points P as starting points, are plotted on the plane of the virtual road. In FIGS. 11 to 13, the driving lane is illustrated as a straight road for descriptive purposes. FIGS. 11 to 13 illustrate states in which the lane-line detection points P and the candidate points G1 to G3 are plotted only at one side of the driving lane. However, the lane-line detection points P and the candidate points G1 to G3 are actually plotted on both sides of the driving lane.

The curve approximation processing section 9b sets a virtual line Ls, which is an approximate curve obtained by the least-square method based upon the lane-line detection points P and the lane-line candidate points G1 and G2, detected by the lane-line candidate point setting section 9a and detected on the reference image, for each of the right and left lane lines. The lane-line position setting section 9c estimates the lane line type of the virtual line Ls set by the curve approximation processing section 9b, and confirms the positions of the left and right lane lines defining the driving lane on which the vehicle M runs, based upon the estimated lane line type. The function of estimating the lane line type of the virtual line Ls corresponds to the lane-line estimating unit in the present invention.

Figure 3:
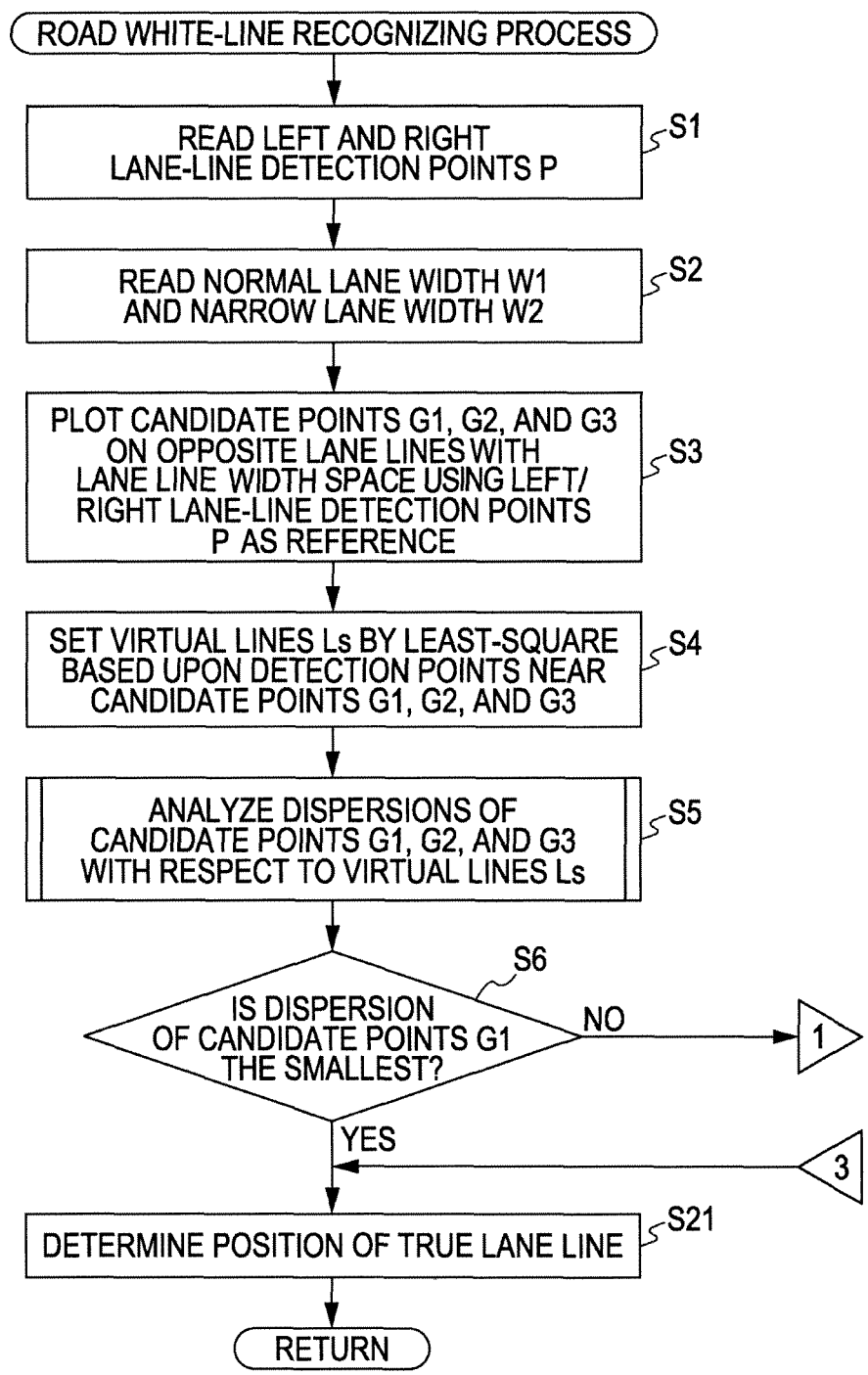
FIG. 3 is a flowchart (1) illustrating a road white-line recognizing process routine.
Figure 4:
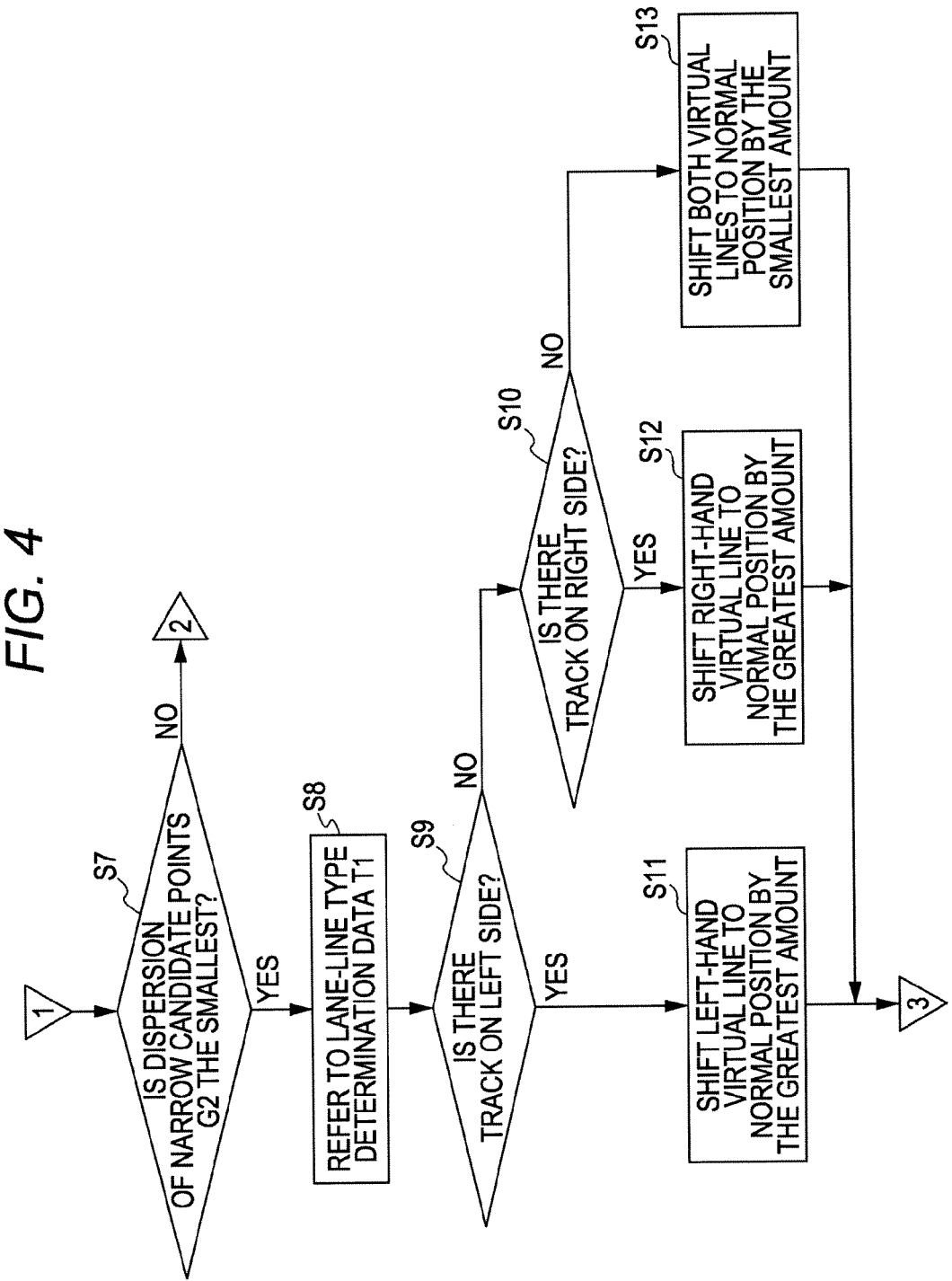
FIG. 4 is a flowchart (2) illustrating a road white-line recognizing process routine.
Figure 5:
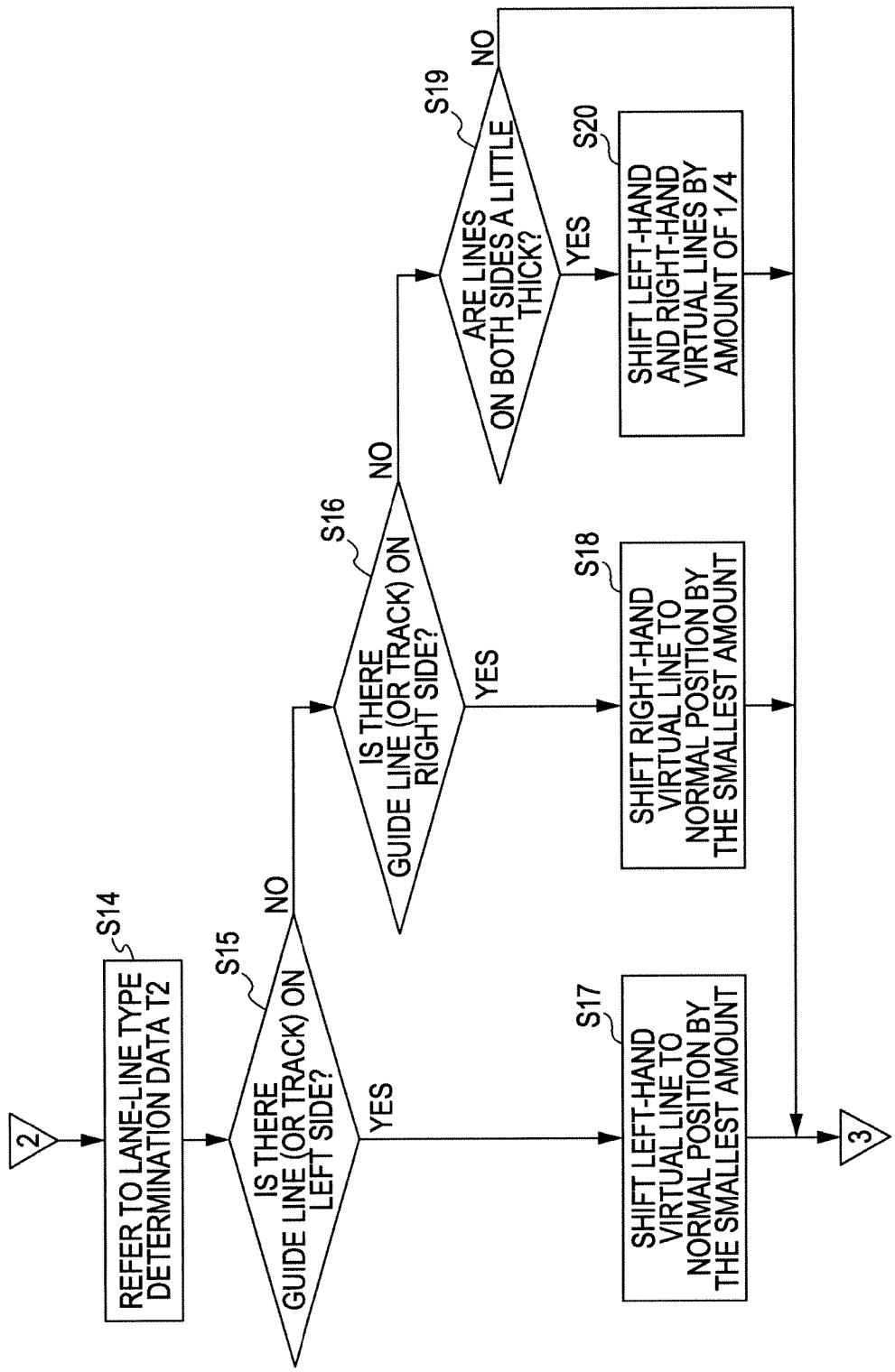
FIG. 5 is a flowchart (3) illustrating a road white-line recognizing process routine.

The processes in the processing sections 9a to 9c are specifically executed in accordance with a road white line recognizing process routine illustrated in FIGS. 3 to 5. In the description below, it is supposed that the vehicle M runs on an express highway.

This routine is executed for every frame of an image captured by the imaging unit 1. In step S1, paired left and right lane-line detection points P are firstly read, and plotted on the plane of the virtual road, whereby a dot sequence of the lane-line detection points P is generated (see FIG. 9). Subsequently, the routine proceeds to step S2 where the normal lane width W1 and the narrow lane width W2 stored in the fixed data memory 9d are read. In step S3, using the lane-line detection points P as starting points, the normal candidate points G1 and the narrow candidate points G2 are plotted on the opposite lane line respectively with a space of the normal lane width W1 and with a space of the narrow lane width W2. Each of normal narrow candidate point G3 is also plotted at the predetermined position between any pair of normal candidate point G1 and the narrow candidate point G2, e.g., at the middle position between both candidate points G1 and G2 (see FIGS. 11 to 13). In FIGS. 11 to 13, the normal candidate points G1 are indicated with circles, the narrow candidate points G2 are indicated with squares, and the normal narrow candidate points G3 are indicated with triangles. The candidate points G1 to G3 are plotted on the left side and the right side based upon the lane-line detection points P detected on the left side and the right side of the driving lane. The processes in steps S1 to S3 correspond to the process in the lane-line candidate point setting section 9a.

Then, the routine proceeds to step S4 where a quadric curve approximation equation of $y=ax^2+bx+c$, which delivers the fittest curve approximation, is obtained by the least-square method based upon the coordinates (x, y) of the dot sequence of the lane-line detection points P and the candidate points G1 to G3, which are plotted for each frame on the left side and the right side of the driving lane. From the quadric curve approximation equation, the virtual line Ls for each of the candidate points G1, G2 and G3 is set. Here, the constant a represents a parameter involved with a curvature of the lane line, the constant b represents an angular parameter involved with an inclination (yaw angle) of the vehicle with respect to the virtual line, and the constant c represents an intercept in the y-axis.

Accordingly, the left and right paired virtual lines Ls are set by the constants a, b, and c described in the above-mentioned equation, wherein the vehicle M is defined as a reference. The process in step S4 corresponds to the process in the curve approximation processing section 9b.

Thereafter, the routine proceeds to step S5 where the dispersion of the candidate points G1 to G3 with respect to the virtual lines Ls is analyzed. In step S6 and following steps, it is estimated whether the virtual lines Ls are any one of a both-side true lane line, a one-side true lane line, or both-side true guide line, based upon candidate points whose dispersion is the smallest. The virtual lines Ls are shifted in the width direction based upon the result of the estimation, whereby the positions of the true lane lines corresponding to the left and right lane lines 21L and 21R defining the driving lane are confirmed.

Specifically, in step S6, it is firstly examined whether or not the dispersion of the normal candidate points G1 is the smallest. When it is determined in step S6 that the dispersion of the normal candidate points G1 is the smallest, the process proceeds to step S21. When it is not determined that the dispersion of the normal candidate points G1 is the smallest, i.e., when it is determined that the dispersion of either the narrow candidate points G2 or the normal narrow candidate points G3 is the smallest, the process moves to step S7.

When it is determined that the dispersion of the normal candidate points G1 is the smallest, and the routine proceeds to step S21, the position of the virtual lines Ls of the current detection are determined to be the positions of the true lane lines, i.e., the inner edges of the actual lane lines 21L and 21R are determined to be detected. Then the routine is exited.

For example, on the express highway having painted thereon one lane line 21L on one side and one lane line 21R on the other side of a driving lane as illustrated in FIG. 6, the driving lane width between the left lane-line detection points P and the right lane-line detection points P is substantially equal to the normal lane width W1. Therefore, as illustrated in FIG. 11, for example, the lane-line detection points P on the right side of the driving lane are firstly detected, and then, the normal candidate points G1 and the narrow candidate points G2 are plotted on the left side of the driving lane using the lane-line detection points P as starting points, respectively with a space of the normal lane width W1 and with a space of the narrow lane width W2. Further, the normal narrow candidate points G3 are plotted between the lane widths W1 and W2 (e.g., at the positions with a space of [(W1+W2)/2]).

Although not illustrated in the figure, the lane-line detection points P are set at the inner edge of the lane line 21L on the left side of the driving lane. Therefore, the lane-line detection points P are represented as a dot sequence on the positions close to the respective normal candidate points G1. Accordingly, she dispersion of the normal candidate points G1, among the respective candidate points G1, G2 and G3, with respect to the virtual line Ls is the smallest, whereby it is determined that the virtual lines Ls of the current detection are formed by detecting the inner edges of the lane lines 21L and 21R. Therefore, the positions of the virtual lines Ls are confirmed to be the positions of the true lane lines.

On the other hand, when the routine branches from step S6 to step S7, it is examined whether or not the dispersion of the narrow candidate points G2 with respect to the virtual line Ls is the smallest. When the dispersion of the narrow candidate points G2 is determined to be the smallest, the routine proceeds to step S8. When it is not determined that the dispersion of the narrow candidate points G2 is the smallest, i.e., the dispersion of the normal narrow candidate points G3 is the smallest, the routine jumps to step S14.

When the dispersion of the narrow candidate points G2 is determined to be the smallest, and the routine proceeds to step S8, the lane-line type determination data T1 (see Table 1) stored in the fixed data memory 9d are read.

TABLE 1

| (Both-side: guide lines) | | |
|---|---|---|
| Left lane line state | Right lane line state | Determination |
| Thick | — | Left-hand: track/ right-hand: true lane line |
| — | Thick | Left-hand: true lane line/ right-hand: track |
| Thick | Thick | Both-side: guide lines |

A possible situation where the dispersion of the narrow candidate points G2 is determined to be the smallest, other than the double white lines having the guide lines 22 painted inside the lane lines 21L and 21R as illustrated in FIG. 12, is that a track 25 is formed along one lane line (in the present embodiment, along the left-hand lane line 21L), and the inner edge is detected from the brightness difference of the reflection light from a puddle in the track 25, as illustrated in FIGS.

Figure 13A:
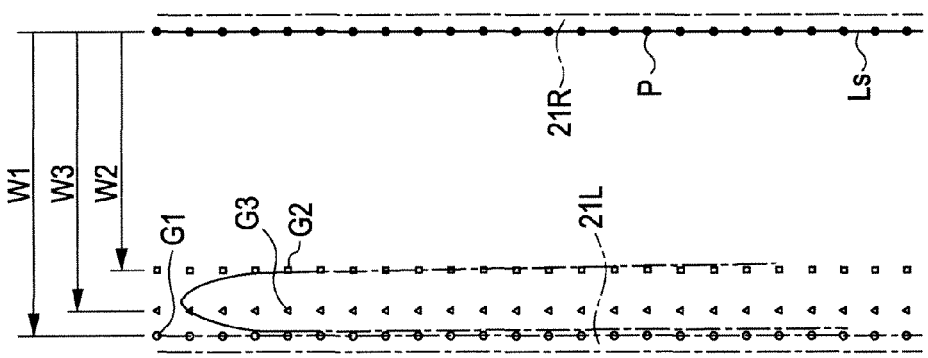
FIGS. 13A to 13C are explanatory views for a situation in which a track is formed on the left side of a road.

13A to 13C. Specifically, as illustrated in FIG. 13A, for example, when a track 25 is formed at the inside of the left-hand lane line 21L along the left-hand lane line 21L, and the inner edge of the track 25 is located on the position where the distance from the inner edge of the right-hand lane line 21R becomes the narrow lane width W2 from, the dot sequence of the narrow candidate points G2 is naturally plotted along the vicinity of the inner edge of the track 25.

Figure 13B:
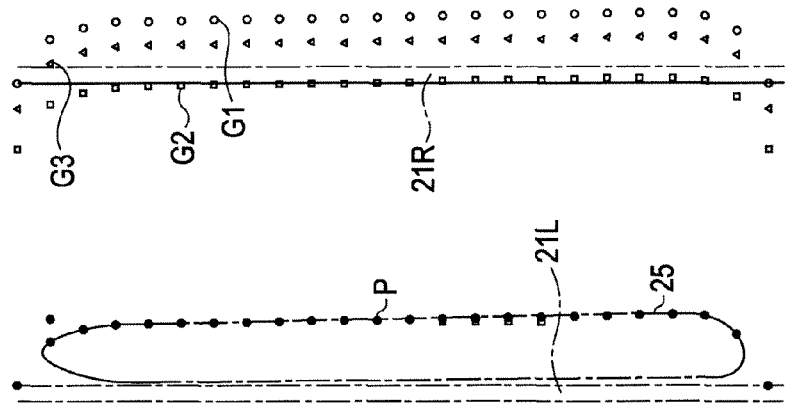

On the other hand, when the puddle is formed in the track 25, and the reflection light from the water surface is received by both cameras 1a and 1b, the lane-line detection points P are set on the inner edge of the track 25 as illustrated in FIG. 13B, since the brightness difference between the inner edge of the track 25 and the road surface is large. As a result, on the right-hand lane line 21R, the normal candidate points G1 and the narrow candidate points G2 are plotted using the lane-line detection points P set in the vicinity of the inner edge of the track 25 as starting points, with a space of the normal lane width W1 and a space of the narrow lane width W2. Further, the normal narrow candidate points G3 are plotted at predetermined positions between both candidate points G1 and G2.

Figure 13C:
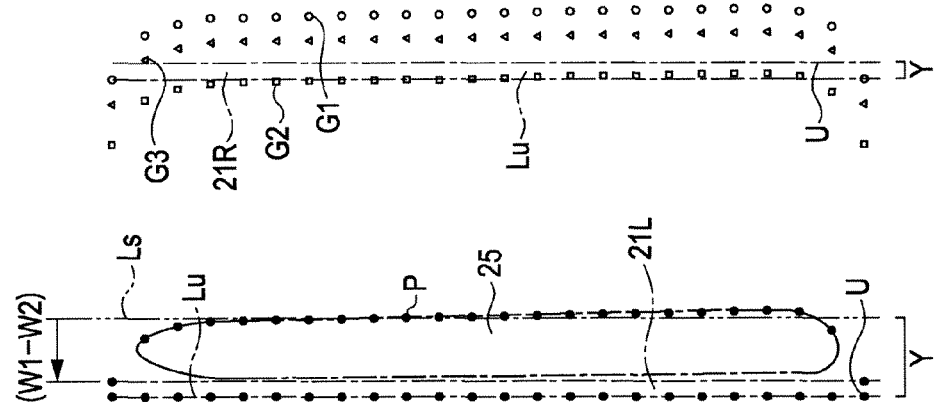

Accordingly, when a curve approximation equation is obtained by the least-square method based upon the lane-line detection points P and the candidate points G1 to G3 plotted on the right side and on the left side of the driving lane, and the virtual lines Ls are set for each of the candidate points G1, G2 and G3 from the curve approximation equation, a dot sequence of the narrow candidate points G2 is plotted in the vicinity of the lane-line detection points P on the lane line 21R (see FIG. 13A), as illustrated in FIG. 13C. Therefore, the dispersion of the narrow candidate points G2 becomes the smallest with respect to the virtual line Ls. On the other hand, on the lane line 21L, the lane-line detection points P are set on the inner edge of the track 25, and a dot sequence of the narrow candidate points G2 is plotted in the vicinity of the lane-line detection points P (see FIG. 13A). Therefore, the dispersion of the narrow candidate points G2 becomes the smallest with respect to the virtual line Ls. When the track 25 is formed at the inside of the right-hand lane line 21R, the symmetric situation is made.

Accordingly, a possible situation when the dispersion of the narrow candidate points G2 is the smallest for each of the left-hand virtual line Ls and the right-hand virtual line Ls, other than the above-described double white line illustrated in FIG. 12, is that a track 25 formed on one side of the driving lane is erroneously recognized as a white line. In step S8, the above-mentioned lane-line type determination data T1 are referred to in order to determine whether the virtual lines Ls set on the left side and on the right side of the driving lane are obtained by detecting the inner guide lines 22 of the double white lines, or are obtained in such a manner that one of the virtual lines Ls is detected as the lane line 21L (or 21R) and the other is recognized as the inner edge of the track 25. In this determination, detection points (outer lane-line detection points) U on the outer edge of the lane lines 21L and 21R are set (see FIG. 13C) from the brightness difference between the outer edges of the lane lines 21L and 21R on both sides of the driving lane and the road surface. On each side a of the driving lane, a curve approximation equation is obtained by the least-square method based upon a dot sequence of the outer lane-line detection points U, and an approximate curve Lu is set from the curve approximation equation so as to obtain a distance (line-to-line distance) Y between the approximate curve Lu and the virtual line Ls.

The line-to-line distance Y is compared with a set threshold value. When the line-to-line distance Y is larger than the set threshold value, it is determined that the line is thick. The predetermined value is set to be shorter than the distance between the outer edges of the lane lines 21L and 21R of the double white lines and the inner edge of the corresponding inner guide line 22, and longer than the line width the lane line 21L (or 21R). In the case in which only the lane lines 21L and 21R are painted on the left side and on the right side of the driving lane as illustrated in FIG. 11, the line-to-line distance Y is short. On the other hand, in the case in which double white lines are painted as illustrated in FIG. 12 or a track 25 is formed as illustrated in FIG. 13, the line-to-line distance Y is long.

Accordingly, in steps S9 and S10 it is determined, by referring to the lane-line type determination data T1, whether one of the lines on the left side and on the right side of the driving lane is a track 25 or an inner guide line 22 of a double white line. When the left-hand lane line is thick, it is determined that the line on the left side of the driving lane is a track 25, and the line on the right side is the true lane line. Then, the routine proceeds from step S9 to step S11 so as to shift the left-hand virtual line Ls toward a normal position by a largest amount, i.e., by the amount corresponding to the difference between the normal lane width W1 and the narrow lane width W2 (W1−W2). Then, the routine proceeds to step S21 where the positions of the left-hand and right-hand virtual lines Ls in the current detection are determined to be the positions of the true lane lines. Then, the routine is exited. Here the normal position means the position of the inner edge of the lane line 21L (or 21R).

As a result, as illustrated in FIG. 13C, the virtual line Ls set on the inner edge of the track 25 is set on the inner edge of the left-hand lane line 21L, which is the true lane line, or on a position close to the inner edge. Therefore, even if the track 25 is formed on the position substantially equal to the position of the inner guide line 22 on one side of the driving lane, the virtual lines Ls are precisely set on the positions of the left-hand and right-hand lane lines defining the driving lane, and the virtual lines Ls can be determined to be the true lane lines.

On the other hand, when the right-hand lane line is thick, it is determined that the line on the right side of the driving lane is a track 25, and the line on the left side is a true lane line. Therefore, the routine proceeds from step S10 to step S12 so as to shift the right-hand virtual line Ls toward the normal position by the largest amount (W1−W2). Then, the process proceeds to step S21 where the positions of the left-hand and right-hand virtual lines Ls in the current detection are determined to be the positions of the true lane lines. Then, the routine is exited.

When both the left-hand lane line and the right-hand lane line are thick, it is determined that both lines are true lane lines and are double white lines whose inner guide lines 22 are detected. Therefore, the routine proceeds from step S10 to step S13 so as to shift the virtual lines Ls on both sides toward the normal positions by a smallest amount, i.e., by the amount corresponding to a half of the difference between the normal lane width W1 and the narrow lane width W2 ((W1−W2)/2). Then, the routine proceeds to step S21 where the positions of the left-hand and right-hand virtual lines Ls in the current detection are determined to be the positions of the true lane lines. Then, the routine is exited. As a result, the virtual lines Ls can precisely be set on the positions of the left-hand and right-hand lane lines defining the driving lane, even if double white lines are painted on the driving lane as illustrated in FIG. 12, and the virtual lines Ls are set in the vicinity of the inner edges of the inner guide lines 22.

On the other hand, when the routine branches from step S7 to step S14, lane-line type determination data T2 (see Table 2) stored in the fixed data memory 9d are read.

TABLE 2

| (One-side: true lane line) | | |
|---|---|---|
| Left lane line state | Right lane line state | Determination |
| Thick | — | Left-hand: guide line (or track)/right-hand: true lane line |
| — | Thick | Left-hand: true lane line/Right-hand: guide line (or track) |
| Moderately thick | Moderately thick | Both-side: narrow guide lines |

When an inner edge of the track 25 formed on one side of the driving lane is formed just between the inner edge of the lane line 21 and the inner edge of the inner guide line 22, the dispersion of the normal narrow candidate points G3 becomes the smallest as the candidate points close to the virtual line Ls. A possible situation where the dispersion of the normal narrow candidate point G3 is determined to be the smallest, other than the formation of the inner edge of the track 25 between the lane line 21 and the inner edge of the inner guide line 22, is that the lane width decreases.

In step S14, the above-mentioned lane-line type determination data T2 are referred to in order to determine whether one of the virtual lines Ls set on the left side and on the right side of the driving lane is obtained by detecting the inner edge of the track 25, or is obtained due to the fact that the width of the driving lane itself decreases. In so doing, although not illustrated, as is with the case in FIG. 13C, outer lane-line detection points U on the outer edge of the lane lines 21L and 21R are set from the brightness difference between the outer edges of the lane lines 21L and 21R on both sides of the driving lane and the road surface. On each side a of the driving lane, a curve approximation equation is obtained from the least-square method based upon a dot sequence of the outer lane-line detection points U, and an approximate curve Lu is set from the curve approximation equation so as to obtain a distance (line-to-line distance) Y between the approximate curve Lu and the virtual line Ls.

The line-to-line distance Y is compared with a set threshold value. When the line-to-line distance Y is larger than the set threshold value, it is determined that the line is thick. The predetermined value is set to be shorter than the distance between the outer edges of the lane lines 21L and 21R and the outer edge of the corresponding inner guide line 22, and longer than the line width of the lane line 21L (or 21R).

When the left-hand lane line is thick, it is determined that the line on the left side of the driving lane is an inner guide line 22 (or a track 25), and the line on the right side is a true lane line. Therefore, the routine proceeds from step S15 to step S17 so as to shift the left-hand virtual line Ls toward the normal position by a smallest amount, i.e., by the amount corresponding to a half of the difference between the normal lane width W1 and the narrow lane width W2 ((W1−W2)/2). Then, the routine proceeds to step S21 where the positions of the left-hand and right-hand virtual lines Ls in the current detection are determined to be the positions of the true lane lines, and then, the routine is exited. As a result, the virtual lines Ls can be set on the left-hand and right-hand lane lines defining the driving lane or on positions close the lane lines, even if the track 25 is formed on the left side of the driving lane and between the above-mentioned inner guide line 22 and the inner edge of the lane line 21.

On the other hand, when the right-hand lane line is thick, it is determined that the line on the right side of the driving lane is an inner guide line 22 (or a track 25), and the line on the left side is a true lane line. Therefore, the routine proceeds from step 316 to step S18 so as to shift the right-hand virtual line Ls toward the normal position by the smallest amount ((W1−W2)/2). Then, the routine proceeds to step S21 where the positions of the left-hand and right-hand virtual lines Ls in the current detection are determined to be the positions of the true lane lines, and then, the routine is exited. As a result, even in this case, the virtual lines Ls can be set on the inner edges of the left-hand and right-hand lane lines 21 defining the driving lane or on the position close to the inner edges, and can be determined.

When the lane lines on both sides are not thick, it is determined that the width of the driving lane itself decreases, i.e., the virtual lines Ls on both sides are set on the inner edges of the lane lines 21, which are the true lane lines, or on the positions close to the lane lines. Therefore, the routine proceeds from step S16 to step S19 where it is examined whether or not the lane lines on both sides are moderately thick. When the lane lines are moderately thick, it is determined that the lines are the narrow inner guide lines 22. Then, the routine proceeds to step S20 where the virtual lines Ls on the right side and on the left side are shifted to the normal position in a very small amount, i.e., shifted in an amount corresponding to a fourth of the difference between the normal lane width W1 and the narrow lane width W2 ((W1−W2)/4). Then, the routine proceeds to step S21 so as to confirm the positions of the virtual lines Ls on the left side and on the right side as the positions of the true lane lines, and thereafter, the routine is exited. When it is not determined that the lane lines on both sides are moderately thick, the routine proceeds to step S21 so as to confirm the positions of the virtual lines Ls on the left side and on the right side as the positions of the true lane lines. Then, the routine is exited.

As a result, even in this case, the virtual lines Ls can be set on the inner edges of the left-hand and right-hand lane lines 21 defining the driving lane or on the position close to the inner edges, and can be confirmed. The processes in steps S5 to S19 correspond to the process in the lane-line position setting section 9c.

When a driver intends to drive the vehicle M on the center of the driving lane, the steering control unit 10 in the steering control system B obtains a curve approximation equation ($y = ax^2 + bx + c$) at the center from a quadric curve approximation equation for obtaining the virtual lines Ls on the left side and on the right side, thereby controlling a steering angle in order that the vehicle M runs along a virtual line Lo obtained from the curve approximation equation at the center, i.e., along a curvature a, as illustrated in FIG. 9. The constant c is an offset amount (in the lateral direction from the origin) in the y-axis direction with the center of the vehicle M (accurately, the middle point of both cameras 1a and 1b) being defined as the origin. In the present embodiment, the left-hand side is specified as positive (+), while the right-hand side is specified as the negative (−). Therefore, when the driver makes a setting such that the vehicle M runs on the center of the driving lane, c is 0 since the center is the origin.

The present invention is not limited to the above-mentioned embodiment. For example, the lane line estimating apparatus can be applied to a lane keeping control that issues an alarm when the vehicle M is about to deviate from the lane. The imaging unit 1 does not have to be the stereo camera including the main camera 1a and the sub-camera 1b. The imaging unit 1 may be a monocular camera. When a monocular camera is used as the imaging unit, three-dimensional information is acquired by a known motion stereo method, for example. The curve approximation equation obtained in the curve approximation processing section 9b is not limited to a quadratic expression, but may be a cubic expression.

What is claimed is:

1. A lane line estimating apparatus comprising:
an imaging unit mounted on a vehicle and configured to image an external environment of the vehicle;
a storage unit configured to store data of a lane-line width for each of plural predetermined lane-line types;
a lane-line candidate point setting unit configured to detect left-hand and right-hand lane-line detection points on a driving lane, on which the vehicle runs, based upon an image of the external environment imaged by the imaging unit, and to set lane-line candidate points on locations, at a space of the lane-line width for each of plural predetermined lane-line types on lane-lines opposite to the detected left-hand and right-hand lane-line detection points;
a curve approximation processing unit configured to obtain a curve approximation equation based upon the lane-line detection points and the lane-line candidate points set on a lane-line of the lane-line detection points, in order to set virtual lines on lane-lines on a left side and on a right side of the driving lane from the curve approximation equation; and
a lane-line type estimating unit configured to obtain a dispersion of the virtual lines set by the curve approximation processing unit so as to estimate the lane-line type of at least one of the left-hand and right-hand virtual lines from the pair of left-hand and right-hand virtual lines indicating a smallest dispersion.

2. The lane line estimating apparatus according to claim 1, wherein the data of the lane-line width stored in the storage unit includes data of a normal width indicating a width between inner edges of lane lines, defining the driving lane on the left side and on the right side thereof, and data of a narrow width indicating a width between inner edges of inner guide lines of double white lines; and
wherein the lane-line types estimated by the lane-line type estimating unit include at least both-side true lane lines corresponding to the lane lines on the left side and on the right side of the driving lane, a one-side true lane line corresponding to the lane line on one side, and both-side guide lines corresponding to the inner guide lines on the left side and on the right side.

3. The lane line estimating apparatus according to claim 2, further comprising a lane-line position setting unit.

4. The lane line estimating apparatus according to claim 3, wherein if the lane-line type estimating unit estimates that the lane-line type includes the both-side true lane lines, then the lane-line position setting unit confirms the positions of the virtual lines as the positions of true lane lines.

5. The lane line estimating apparatus according to claim 3, wherein if the lane-line type estimating unit estimates that the lane line type comprises the one-side true lane line, then the lane-line position setting unit determines whether a virtual line of the virtual lines comprises the lane line or the guide line based upon a distance between an outer edge of the lane line and the virtual line;
wherein, if the lane-line position setting unit determines that the virtual line comprises the lane line, then the lane-line position setting unit confirms the position of the virtual line as the position of the true lane line, and confirms the position where the other of the virtual lines is shifted to the outside of the driving lane by an amount corresponding to a half of the difference between the normal width and the narrow width as the position of the true lane line; and
wherein, if the lane-line position setting unit determines that the virtual line comprises a guide line, then the lane-line position setting unit confirms the position of the other of the virtual lines as the position of the true lane line, and confirms the position where the virtual line is shifted to the outside of the driving lane by an amount corresponding to a half of the difference between the normal width and the narrow width as the position of the true lane line.

6. The lane line estimating apparatus according to claim 3, wherein if the lane-line type estimating unit determines that the lane-line type of the virtual lines comprises the both-side guide lines, then the lane-line position setting unit determines whether a virtual line of the virtual lines comprises the lane line or the guide line based upon the distance between an outer edge of the lane line and the virtual line;
wherein, if the lane-line position setting unit determines that the virtual line comprises the lane line, then the lane-line position setting unit confirms the position of the virtual line as the position of the true lane line, and determines the position where the other of the virtual lines is shifted to the outside of the driving lane by an amount corresponding to the difference between the normal width and the narrow width as the position of the true lane line; and
wherein, if the lane-line position setting unit determines that the virtual line comprises the guide line, then the lane-line position setting unit determines whether the other of the virtual lines comprises the lane line or the guide line based upon the distance between the outer edge of the other lane line and the other of the virtual lines, and if the lane-line position setting unit determines that the other of the virtual lines comprises the lane line, then the lane-line position setting unit confirms the position of the other of the virtual lines as the position of the true lane line, and confirms the position where the virtual line is shifted to the outside of the driving lane by an amount corresponding to the difference between the normal width and the narrow width as the position of the true lane line; and
wherein, if the lane-line position setting unit determines that the virtual lines on both sides are the guide lines, then the lane-line position setting unit confirms the positions where the virtual lines on the left side and on the right side are respectively shifted to the outside of the driving lane by an amount corresponding to a half of the difference between the normal width and the narrow width as the positions of the true lane lines.

7. A lane line estimating apparatus according to claim 3, wherein, if the lane-line type estimating unit estimates that lane type of the virtual lines on the left side and on the right side comprises the one-side true lane line, then the lane-line position setting unit determines whether the one-side true lane line comprises the lane line, the guide line, or a line located between the lane line and the guide line, based upon the distance between the virtual line and the outer edge of the lane line of the virtual line side, and if the lane-line position setting unit determines that the virtual lines on both sides are the lines between the corresponding lane line and the corresponding guide line, then the lane-line position setting unit confirms the positions where the virtual lines on the left side and the right side are respectively shifted to the left and to the right of the driving lane by an amount corresponding to a fourth of the difference between the normal width and the narrow width as the positions of the true lane lines.

8. The lane line estimating apparatus according to claim 3, wherein if the lane-line type estimating unit estimates that the lane-line type comprises the one-side true lane line, then the lane-line position setting unit determines whether a virtual line of the virtual lines comprises the lane line or the guide line based upon a distance between an outer edge of the lane line and the virtual line;

wherein, if the lane-line position setting unit determines that the virtual line comprises the lane line, then the lane-line position setting unit confirms the position of the virtual line as the position of the true lane line, and confirms the position where the other of the virtual lines is shifted to the outside of the driving lane by an amount corresponding to a half of the difference between the normal width and the narrow width as the position of the true lane line; and wherein, if the lane-line position setting unit determines that the virtual line comprises a guide line, then the lane-line position setting unit confirms the position of the other of the virtual lines as the position of the true lane line, and confirms the position where the virtual line is shifted to the outside of the driving lane by an amount corresponding to a half of the difference between the normal width and the narrow width as the position of the true lane line.

9. The lane line estimating apparatus according to claim 3, wherein if the lane-line type estimating unit determines that the lane-line type of the virtual lines comprises the both-side guide lines, then the lane-line position setting unit determines whether a virtual line of the virtual lines comprises the lane line or the guide line based upon the distance between an outer edge of the lane line and the virtual line;

wherein, if the lane-line position setting unit determines that the virtual line comprises the lane line, then the lane-line position setting unit confirms the position of the virtual line as the position of the true lane line, and determines the position where the other of the virtual lines is shifted to the outside of the driving lane by an amount corresponding to the difference between the normal width and the narrow width as the position of the true lane line; and wherein, if the lane-line position setting unit determines that the virtual line comprises the guide line, then the lane-line position setting unit determines whether the other of the virtual lines comprises the lane line or the guide line based upon the distance between the outer edge of the other lane line and the other of the virtual lines, if the lane-line position setting unit determines that the other of the virtual lines comprises the lane line, then the lane-line position setting unit confirms the position of the other of the virtual lines as the position of the true lane line, and confirms the position where the virtual line is shifted to the outside of the driving lane by an amount corresponding to the difference between the normal width and the narrow width as the position of the true lane line; and wherein, if the lane-line position setting unit determines that the virtual lines on both sides comprise the guide lines, then the lane-line position setting unit confirms the positions where the virtual lines on the left side and on the right side are respectively shifted to the outside of the driving lane by an amount corresponding to a half of the difference between the normal width and the narrow width as the positions of the true lane lines.

10. The lane line estimating apparatus according to claim 3, wherein the curve approximation processing unit is configured to obtain a center curve approximation equation based upon the virtual lines on the left side and on the right side of the driving lane.

11. The lane line estimating apparatus according to claim 1, wherein the detection points correspond to at least one of inner edges of lane lines, inner edges of inner guide lines of double white lines, and an edge portion between an inside of a track and a road surface.

12. The lane line estimating apparatus according to claim 2, wherein the lane-line candidate point setting unit is configured to set normal lane-line candidate points on the opposite lane line at a space of the normal width, using the left-hand and right-hand lane-line detection points as starting points.

13. The lane line estimating apparatus according to claim 12, wherein the lane-line candidate point setting unit is configured to set narrow lane-line candidate points on the opposite lane line at a space of the narrow width, using the left-hand and right-hand lane-line detection points as the starting points.

14. The lane line estimating apparatus according to claim 13, wherein the lane-line candidate point setting unit is configured to set narrow normal lane-line candidate points on the opposite lane line at a predetermined position between the normal lane-line candidate points and narrow lane-line candidate points.

15. The lane line estimating apparatus according to claim 14, wherein the curve approximation processing unit is configured to obtain candidate point curve approximation equations based upon each of the normal lane-line candidate points, the narrow lane-line candidate points, and the normal narrow lane-line candidate points set by the lane-line candidate point setting unit, in order to set virtual lines on the left side and on the right side of the driving lane from each of the candidate point curve approximation equations, respectively.

* * * * *